(12) United States Patent
Bayardo et al.

(10) Patent No.: US 11,757,985 B1
(45) Date of Patent: Sep. 12, 2023

(54) SYSTEMS AND METHODS FOR A BLOCKCHAIN INTEROPERABILITY PLATFORM

(71) Applicant: Coinbase, Inc., Oakland, CA (US)

(72) Inventors: Roberto Bayardo, Oakland, CA (US); Justin Blumenthal, Oakland, CA (US); Huiyi Li, Oakland, CA (US); Xiang Li, Oakland, CA (US); Leopoldo Orines, Oakland, CA (US); Sharanjai Prasad, Oakland, CA (US); Alex Wolfe, Oakland, CA (US); Qi Wu, Oakland, CA (US); Andrew Min, Oakland, CA (US); Francis Hamand, Oakland, CA (US); Hao Xue, Oakland, CA (US); Zoltan Onodi-Szucs, Oakland, CA (US)

(73) Assignee: Coinbase, Inc., Oakland, CA (US)

( * ) Notice: Subject to any disclaimer, the term of this patent is extended or adjusted under 35 U.S.C. 154(b) by 0 days.

(21) Appl. No.: 18/055,860

(22) Filed: Nov. 16, 2022

(51) Int. Cl.
*H04L 67/1008* (2022.01)
*H04L 9/32* (2006.01)
*H04L 67/1014* (2022.01)
*H04L 9/08* (2006.01)

(52) U.S. Cl.
CPC ........ *H04L 67/1008* (2013.01); *H04L 9/0825* (2013.01); *H04L 9/3213* (2013.01); *H04L 67/1014* (2013.01)

(58) Field of Classification Search
None
See application file for complete search history.

(56) References Cited

U.S. PATENT DOCUMENTS

| 10,929,845 | B2 * | 2/2021 | Li ........................ H04L 9/0643 |
| 11,134,120 | B2 * | 9/2021 | Snow ...................... G06F 16/27 |
| 2018/0337847 | A1 * | 11/2018 | Li ....................... H04L 67/1059 |

* cited by examiner

*Primary Examiner* — Backhean Tiv
(74) *Attorney, Agent, or Firm* — Perkins Coie LLP

(57) ABSTRACT

Methods and systems described herein relate to an improved platform that provides support to the deposits and/or withdrawals of multi-network assets between two levels of a blockchain network. More specifically, the methods and systems provide this improved platform by introducing additional liquidity pools that allow for transfers without having to bridge between the two levels.

20 Claims, 7 Drawing Sheets

SYSTEMS AND METHODS FOR A BLOCKCHAIN INTEROPERABILITY PLATFORM

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a time stamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

Systems and methods are described herein for novel uses and/or improvements to blockchains and blockchain technology. As one example, methods and systems are described herein for allowing systems to access a multi-network asset otherwise known as layer one and layer two of a blockchain.

Conventional systems have not been able to achieve a platform where exchanges can seamlessly happen from layer one and layer two of blockchain technology. For example, conventional systems require users to wait up to five hours or more to go from one network to another due to the time requirements of respective consensus mechanisms for each bridge. Furthermore, conventional systems require users to use different wallets and execute multiple transactions/exchanges, and current bridging platforms must use multiple bridges and pay gas fees at each stop.

To overcome these technical deficiencies in conventional systems, systems and methods disclosed herein utilize a platform load balancer, where one side has processing loads and the other side has available processing loads. For example, conventional systems would have no choice but to utilize bridging to access the gap between layers one and two of the multi-network asset. There is no platform load balancer with a liquidity pool available. Accordingly, the systems and methods disclosed herein will allow users to know right away whether funds are available to transfer and whether the bridge is available, thus allowing transfers to happen more quickly.

In some aspects, systems and methods for managing blockchain processing loads of blockchain operations conducted across multiple blockchain networks are described. For example, the system may receive, at a platform load balancer, a first blockchain operation involving a first processing request from a first blockchain address on a first blockchain network to a second blockchain address on a second blockchain network. The system may determine, at the platform load balancer, a processing load for the first blockchain operation. The system may determine, at the platform load balancer, an available processing load at a first supplemental address for the second blockchain network. The system may compare the processing load to the available processing load. The system may, in response to determining that the processing load is within the available processing load, generate a second blockchain operation from the first supplemental address to the second blockchain address, wherein the second blockchain operation has the processing load.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
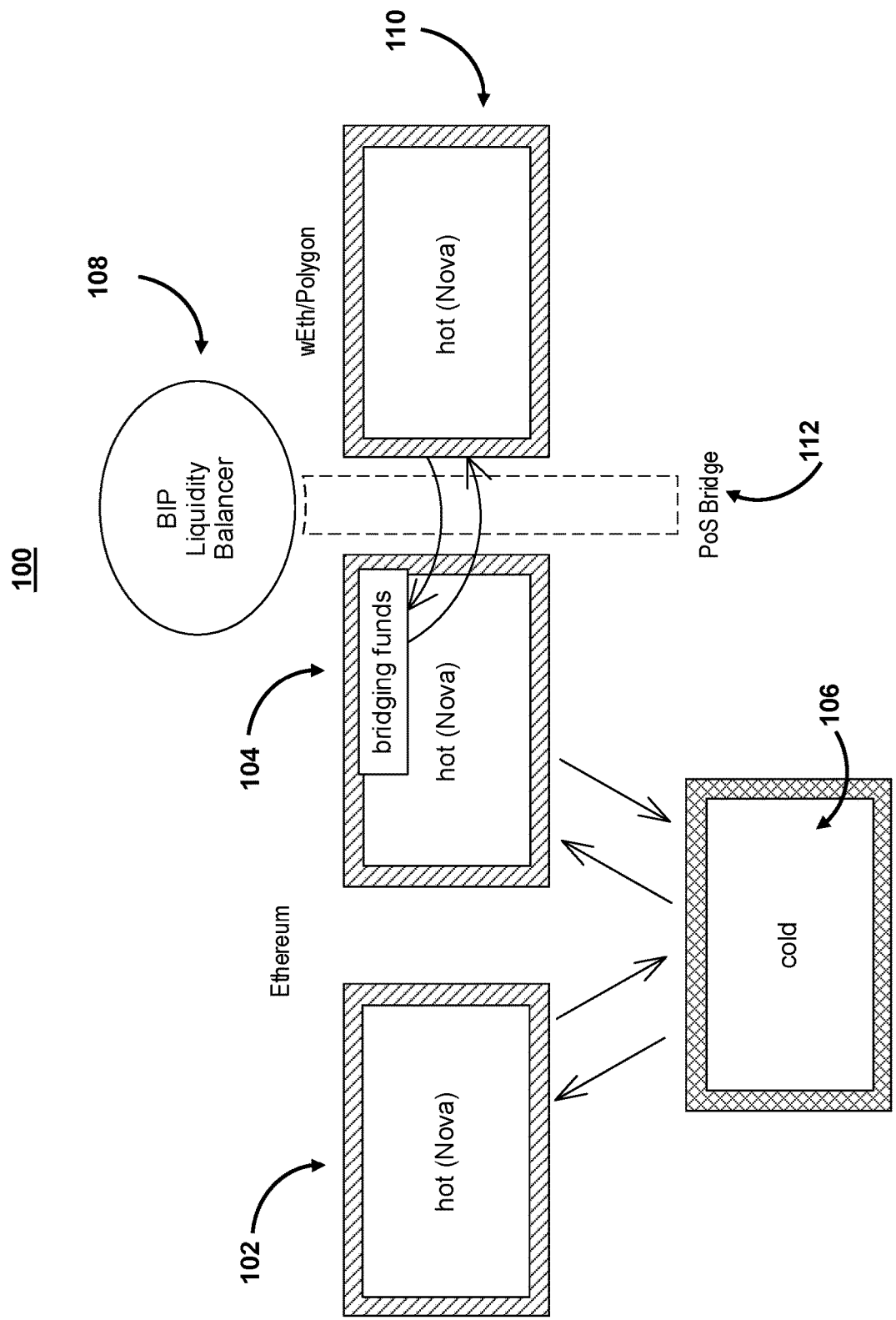
FIG. 1 shows an illustrative diagram for managing blockchain processing loads of blockchain operations conducted across multiple blockchain networks with a platform load balancer, in accordance with one or more embodiments.

FIG. 1 shows an illustrative diagram for managing blockchain processing loads of blockchain operations conducted across multiple blockchain networks with a platform load balancer, in accordance with one or more embodiments. For example, the system may indicate allowing the user to easily access a multi-network asset. For example, FIG. 1 illustrates utilization of a platform load balancer, where one side has processing loads and the other side has available processing loads. For example, the conventional systems would have no choice but to utilize bridging to access the gap between layers one and two of the multi-network asset. There is no platform load balancer with a liquidity pool available. As such, the system will allow users to know right away whether funds are available to transfer and whether the bridge is available, thus allowing transfers to happen more quickly.

The system may use a platform load balancer. As referred to herein, a "platform load balancer" may include the software, hardware, and coordinating programs used to host an application or service that uses a set of tools and instructions for a particular processor. In some embodiments, the platform load balancer may comprise software that contains a set of tools to help maintain a specific amount of available processing loads to balance two sides of a platform. In some embodiments, the platform load balancer may comprise software that invokes a cross-chain bridge.

The system may use a processing request. As referred to herein, a "processing request" may include an instance when an application programming interface (API) supplies a request structure to store the incoming request, and then the application handles the request and sends a response. In some embodiments, the processing request may include an amount relating to the blockchain operation or transaction. In some embodiments, the processing request may include the size of the blockchain operation.

The system may use an available processing load. As referred to herein, an "available processing load" may include the amount of available cryptocurrency inside of the liquidity pool. In some embodiments, the available processing load may include a liquidity pool inside of a hot wallet. In some embodiments, the available processing load may include a processing load being compared with a platform balancer because of a processing request.

The system may use a supplemental address. As referred to herein, a "supplemental address" may include the address of a blockchain network where a blockchain operation takes place. In some embodiments, the supplemental address may include a liquidity pool that maintains some amount of liquidity on both networks for each supported asset. In some embodiments, the supplemental address may include an address where funds or digital wallets are found.

The system may use a platform load balancer. As referred to herein, a "platform load balancer" may include a liquidity balancer that orchestrates the movement of available processing loads between blockchain networks. In some embodiments, if the system determines the available processing load at a supplemental address is greater than the processing load at the first blockchain address, the platform load balancer may generate a blockchain operation from the supplemental address to the first blockchain network, wherein available processing loads are transferred. In some embodiments, if the system determines the available processing load at a supplemental address is less than the processing load at the first blockchain address, the platform load balancer may generate a blockchain operation from the first blockchain network to the supplemental address, wherein the processing loads are transferred.

The system may use credit pausing. As referred to herein, "credit pausing" may include the system taking a pause in crediting a user with transferred funds until sufficient funds can be bridged to the cryptocurrency should the liquidity pool become too deep. In some embodiments, if the system receives a plurality of processing requests for one blockchain network, the system may determine to not generate a blockchain operation from the supplemental address and return the processing load to the blockchain network. The system may determine to generate the blockchain operation at a later time. By doing so, the system may protect the exchange rate of the second blockchain network.

For example, FIG. 1 shows platform 100. Platform 100 includes digital wallets 102, 104, and 110, and a physical device 106, which may correspond to a liquidity pool. As described herein, a liquidity pool may refer to an available processing load.

Platform 100 may receive at 108, the platform load balancer, a first blockchain operation involving a first processing request from a first blockchain address on a first blockchain network to a second blockchain address on a second blockchain network. The platform load balancer 108 determines a processing load for the first blockchain operation from digital wallet 104. The platform load balancer 108 determines an available processing load at a first supplemental address for digital wallet 110. The platform load balancer 108 compares the processing load at digital wallet 104 to the available processing load at digital wallet 110. The platform load balancer 108, in response to determining that the processing load at digital wallet 104 is within the available processing load at digital wallet 110, generates a second blockchain operation from the first supplemental address to the second blockchain address, wherein the second blockchain operation has the processing load.

The platform load balancer 108, in response to determining that the processing load is not within the available processing load, generates a cross-chain bridge call. The cross-chain bridge 112 requests a wrapped token, issued by a cross-chain bridge provider platform, corresponding to the processing load and receives the wrapped token.

The platform load balancer 108, in response to determining that the processing load at digital wallet 104 is not within the available processing load at digital wallet 110, generates the second blockchain operation from the first supplemental address to the second blockchain address, which further comprises generating a fourth blockchain operation from a third supplemental address at digital wallet 102 to a fourth supplemental address, wherein both the third supplemental address and the fourth supplemental address correspond to the platform load balancer 108, and wherein the fourth supplemental address is a storage repository at physical device 106.

Figure 2:
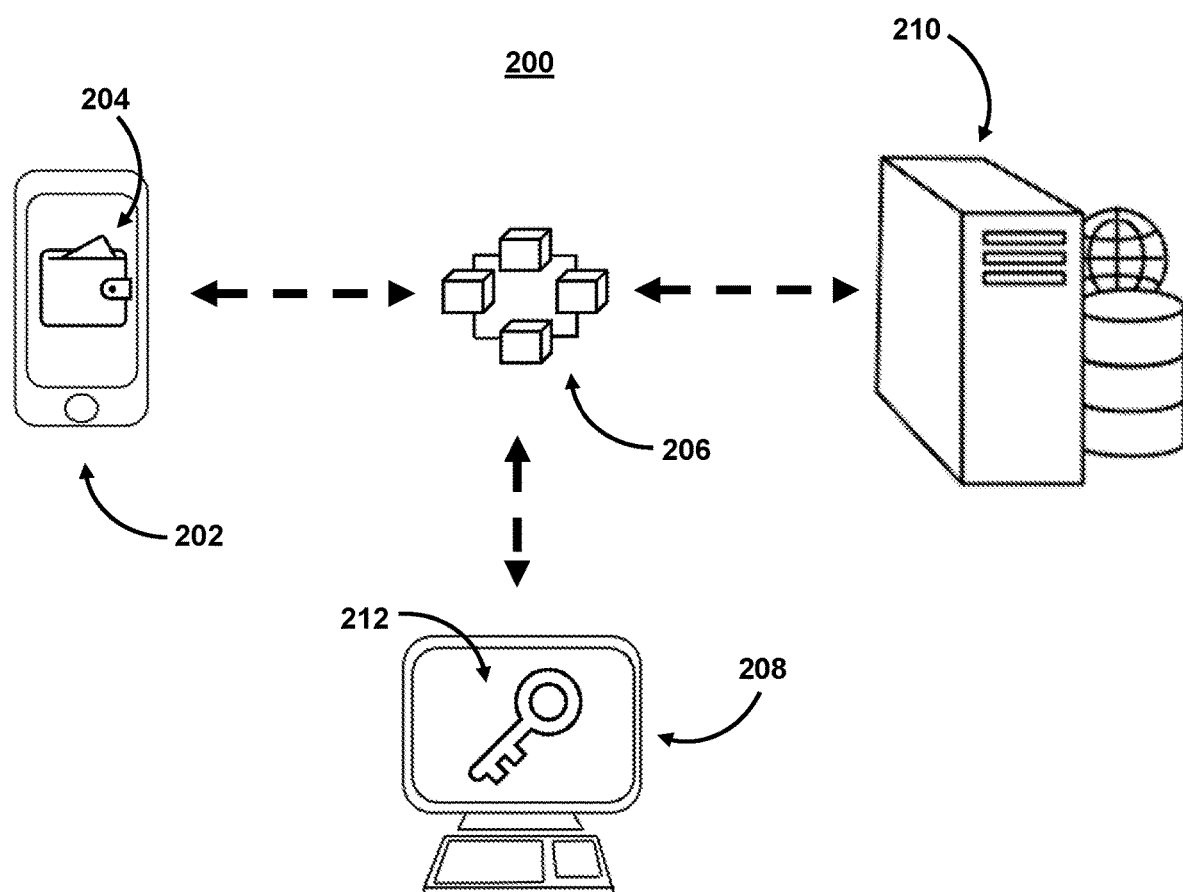
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used to manage blockchain processing loads of blockchain operations conducted across multiple blockchain networks with a platform load balancer in some embodiments.

FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to manage blockchain processing loads of blockchain operations conducted across multiple blockchain networks with a platform load balancer, and the user interface may display content related to managing blockchain processing loads of blockchain operations conducted across multiple blockchain networks with a platform load balancer. As referred to herein, "content" should be understood to mean an electronically consumable user asset, representations of goods or services (including nonfungible tokens), internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to managing blockchain processing loads of blockchain operations conducted across multiple blockchain networks with a platform load balancer. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a cryptography-based storage application (e.g., digital wallet 204) used to perform blockchain operations. The cryptography-based storage application may be used to perform a plurality of blockchain operations across a computer network. The cryptography-based storage application may, in some embodiments, correspond to a digital wallet. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Digital wallet holders may hold both a hot wallet and a cold wallet. Hot wallets are most often used to perform blockchain operations, while a cold wallet is generally used for managing a user account and may have no connection to the internet.

In some embodiments, the cryptography-based storage application may correspond to a key-based wallet or a smart contract wallet. For example, a key-based wallet may feature public or private keys and allow a user to either have control of the account or receive transactions in the account. A smart contract wallet may comprise blockchain programs or digital agreements that execute transactions between parties once a predetermined condition is met. For example, a smart contract wallet may be managed by a smart contract (e.g., or smart contract code) instead of a private key. As such, a smart contract wallet may improve speed, accuracy, trust, and/or transparency in blockchain operations. In some embodiments, a cryptography-based storage application may include, or have access to, a key-based wallet or a smart contract wallet. For example, the cryptography-based storage application may comprise a digital or other construct (e.g., a reference, a pointer, a text on a blockchain, an address, etc.).

As shown in FIG. 2, one or more user devices may include a private key (e.g., key 212) and/or digital signature. For example, system 200 may use cryptographic systems for conducting blockchain operations such as managing blockchain processing loads of blockchain operations conducted across multiple blockchain networks with a platform load balancer. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that system 200 is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding the operation to the blockchain. System 200 may add the blockchain operation to blockchain 206. System 200 may perform this operation based on a consensus of the user devices within system 200.

For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that the device performed computational work to validate a blockchain operation and thus this mechanism provides a manner for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 200 may use a proof-of-stake mechanism in which a user account (e.g., corresponding to a node on the blockchain network) is required to have, or "stake," a predetermined number of tokens in order for system 200 to recognize the user account as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
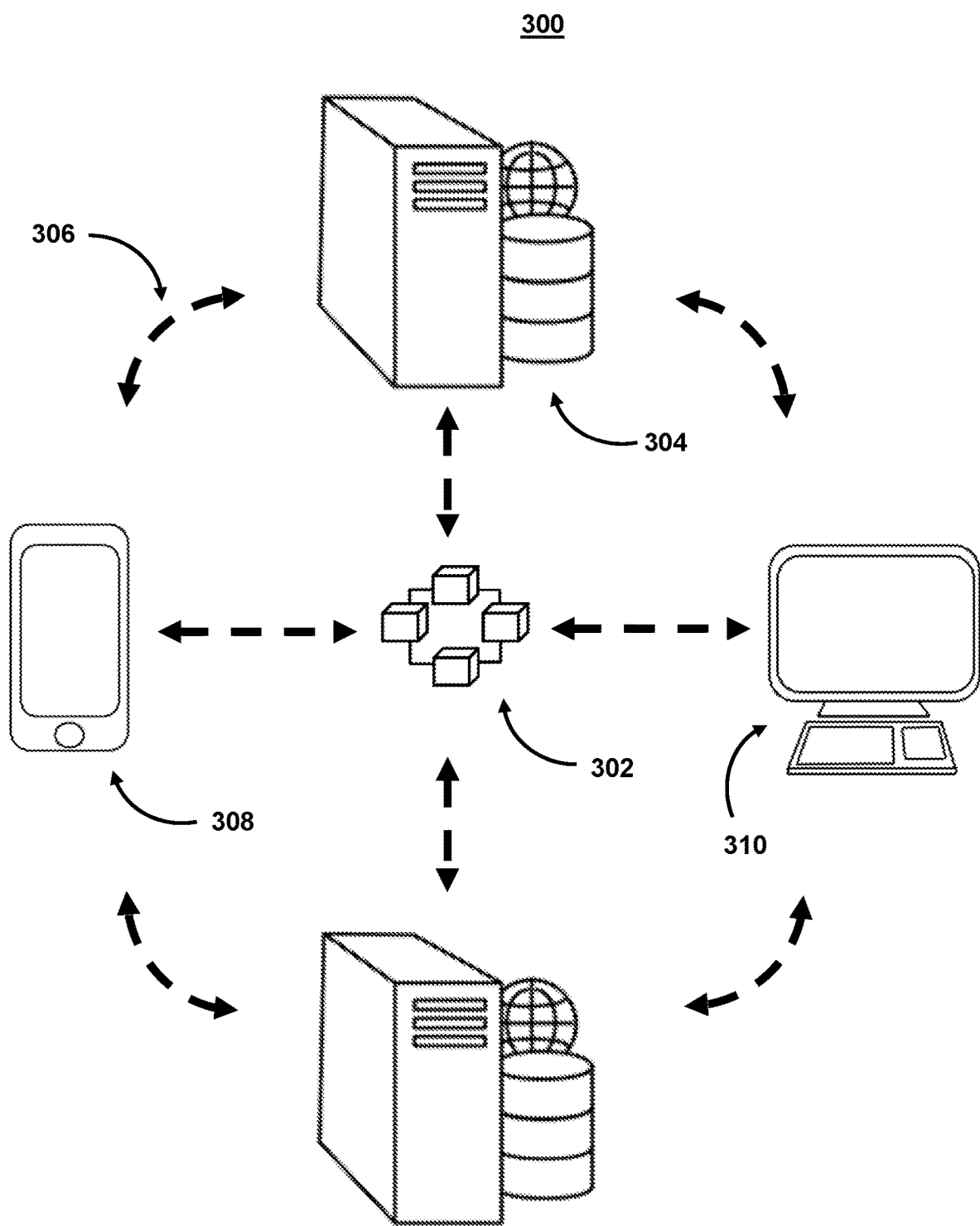
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may manage blockchain processing loads of blockchain operations conducted across multiple blockchain networks with a platform load balancer within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations).

Additionally, the devices in system 300 may run an application (or another suitable program). The application may cause the processors and/or control circuitry to perform operations related to managing blockchain processing loads of blockchain operations conducted across multiple blockchain networks with a platform load balancer within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
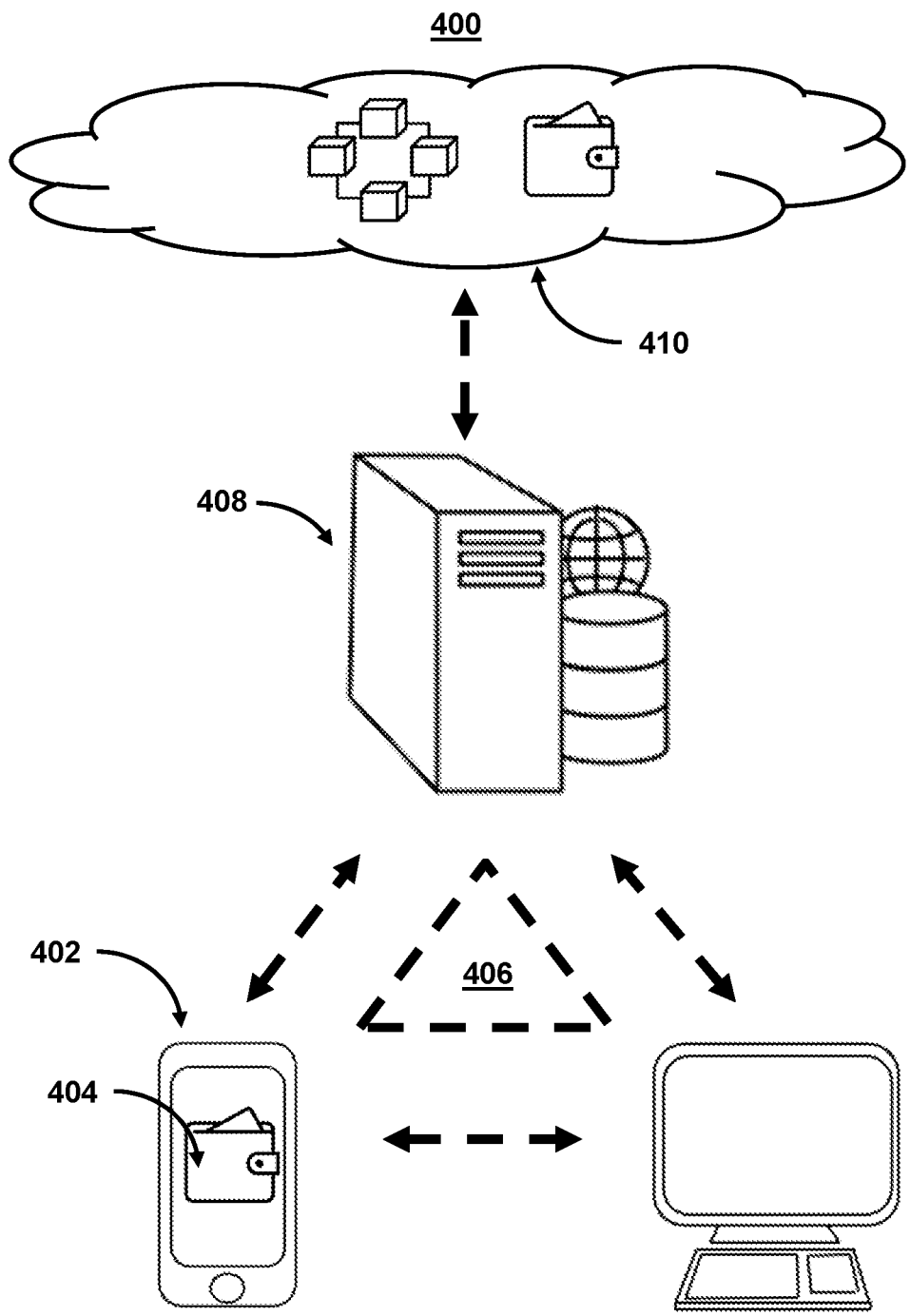
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or APIs in order to manage blockchain processing loads of blockchain operations conducted across multiple blockchain networks with a platform load balancer. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively, or additionally, API layer 406 may reside on one or more cloud components (e.g., server 408). For example, API layer 406 may reside on a server 408 and comprise a platform service for a custodial wallet service, decentralized application, etc. API layer 406 (which may be a representational state transfer (REST) or web services API layer) may provide a decoupled interface to data and/or functionality of one or more applications.

API layer 406 may provide various low-level and/or blockchain-specific operations in order to facilitate managing blockchain processing loads of blockchain operations conducted across multiple blockchain networks with a platform load balancer. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to ten minutes based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and the custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PUP, and JavaScript. Simple Object Access Protocol (SOAP) web services have traditionally been adopted in the enterprise for publishing internal services as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and distributed denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/or other devices. In some embodiments, a wallet service may also provide access to an additional ledger (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in case of forks, system 400 performs some internal remediation on user accounts, which is enabled by system 400 maintaining a layer of insulation, from the blockchain, for remedial blockchain operations. For example, system 400 may have a separate storage, protected by the second ledger (e.g., a ledger service), for reads, and by a transfer service, for writes, that reflects the state of the blockchain that is relevant for system 400 purposes.

In some embodiments, the system may also use one or more application binary interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which is executed on EVM. Smart contracts written in high-level languages like Solidity or Vyper may be compiled in EVM-executable bytecode by the system. Upon deployment of the smart contract, the bytecode is stored on the blockchain and is associated with an address. To access functions defined in high-level languages, the system translates names and arguments into byte representations for byte code to work with the system. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, doing translations between human-intended method calls and smart-contract operations in a manner that is discoverable and reliable.

For example, ABI defines the methods and structures used to interact with the binary contract similar to an API, but on a lower level. The ABI indicates the caller of the function to encode (e.g., ABI encoding) the needed information, like function signatures and variable declarations, in a format that the EVM can understand to call that function in bytecode. ABI encoding may be automated by the system using compilers or wallets interacting with the blockchain.

Figure 5:
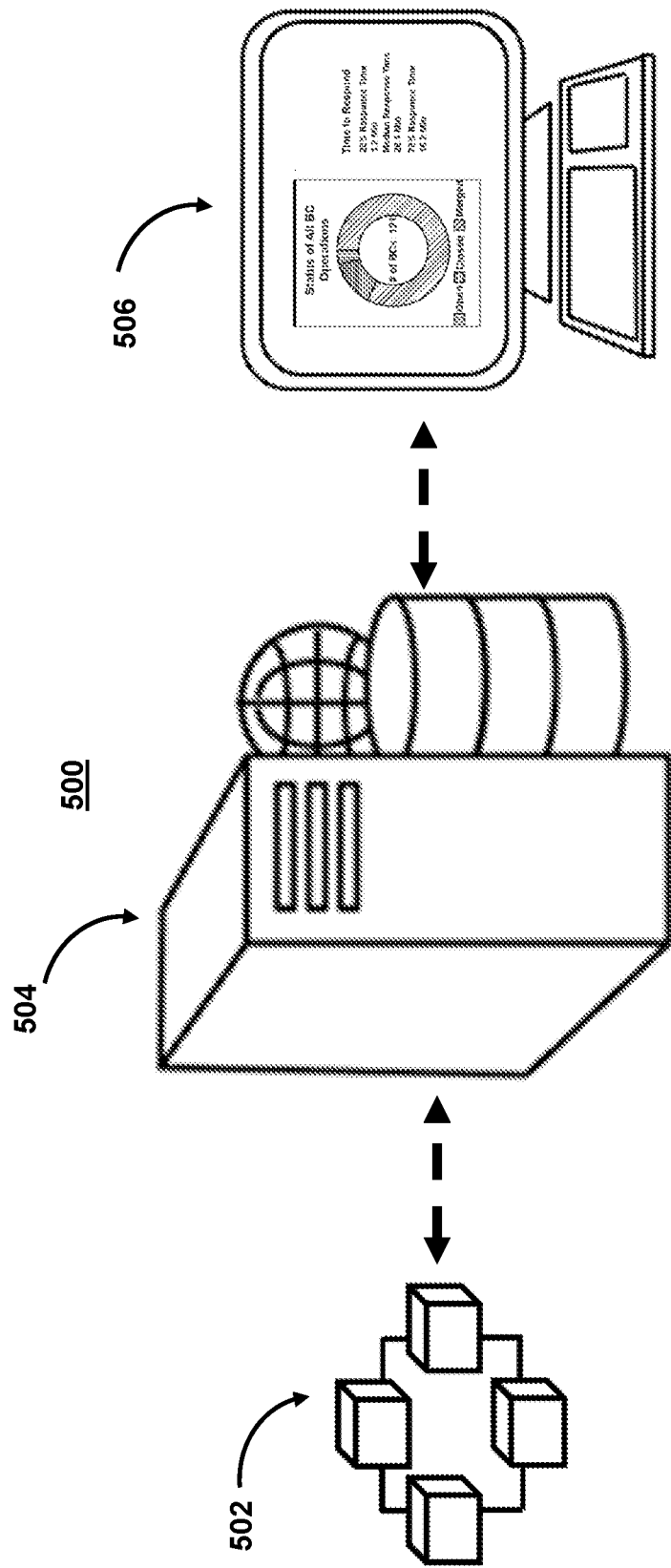
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 to manage blockchain processing loads of blockchain operations conducted across multiple blockchain networks with a platform load balancer. Indexer service 500 may fetch raw data (e.g., data related to a current state and/or instance of blockchain 502) from a node of a blockchain network (e.g., as described above). Indexer service 500 may then process the data and store the data in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," "internal transfer," "new contract metadata," "ownership change," etc.) as well as blockchain operations related to a given protocol, protocol subgroup, and/or other characteristic (e.g., "ETH," "ERC20," and/or "ERC721"). Additionally and/or alternatively, the various blockchain operations and metadata related to those blockchain operations (e.g., block designations, user accounts, time stamps, etc.) as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6:
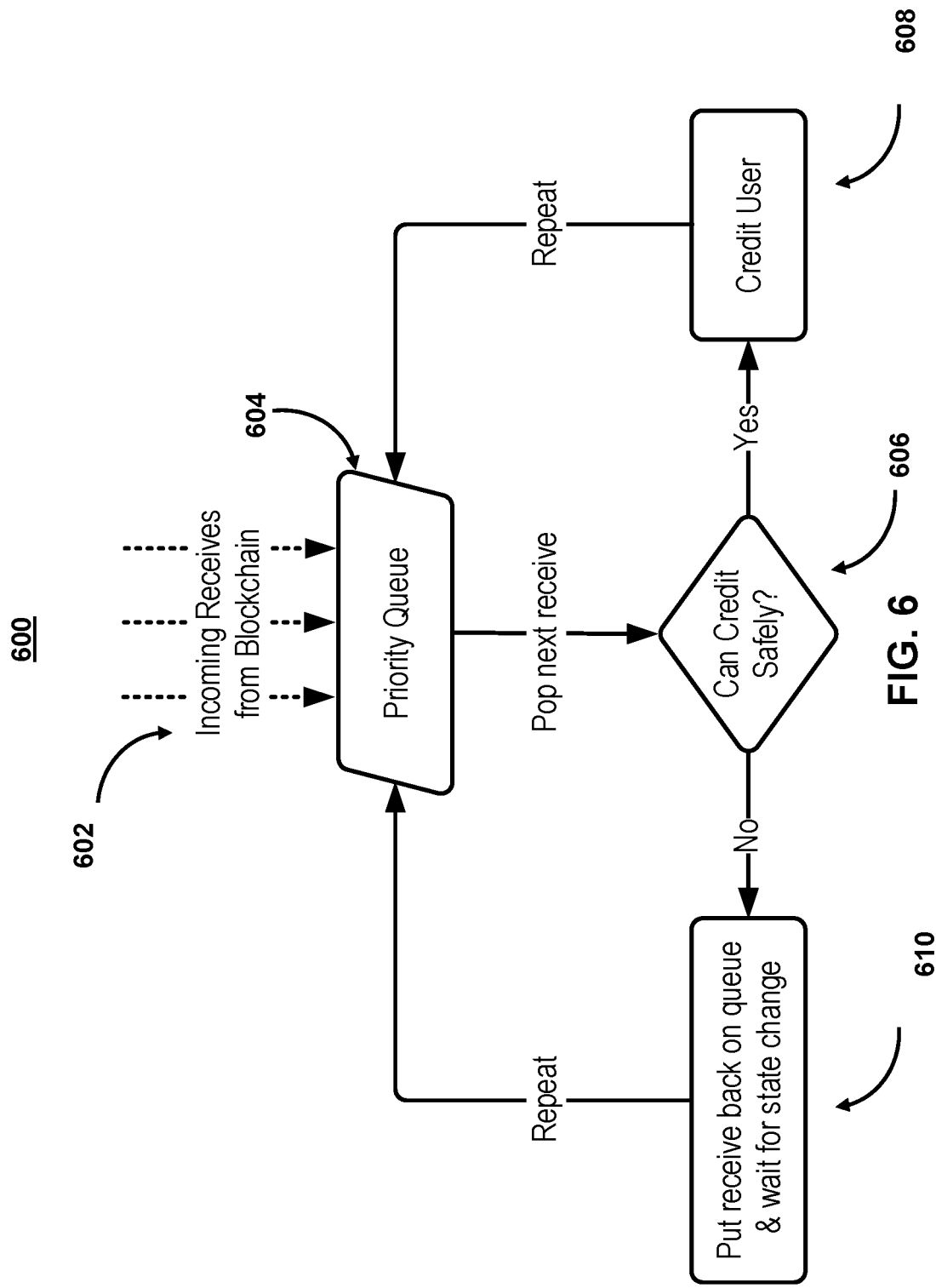
FIG. 6 shows a flowchart of the steps for generating a priority queue, in accordance with one or more embodiments.

FIG. 6 shows a flowchart of the steps for generating a priority queue, in accordance with one or more embodiments. For example, the system may use process 600 (e.g., as implemented on one or more system components described above) in order to generate a priority queue used to manage blockchain processing loads of blockchain operations conducted across multiple blockchain networks by using credit orchestration in some embodiments.

The system may use credit orchestration. As referred to herein, "credit orchestration" may include the system maintaining a priority queue of incoming but uncredited transfers of a given asset from the cryptocurrency wherein the system may first select an incoming transfer that can be credited without depleting the liquidity pool. Second, the system may credit that asset to the user. Third, the system may repeat this process. In some embodiments, the system may determine whether the incoming processing request can be credited safely before generating a blockchain operation from the supplemental address to the first blockchain network, wherein available processing loads are transferred. By doing so, the system may avoid a situation in which a single massive deposit blocks the system from crediting an asset to all other users.

At step 602, process 600 may receive a plurality of processing requests from the first blockchain address on the first blockchain network to the second blockchain address on the second blockchain network. As referred to herein, "incoming receives from the blockchain" may include a plurality of processing requests.

At step 604, process 600 may generate a priority queue of processing requests. As referred to herein, a "priority queue" may include a process in which the platform load balancer favors processing requests that can be credited immediately. In some embodiments, a priority queue may include a data structure that assigns a priority to each processing request within the queue. In generating the priority queue of processing requests, the system may select a processing request from the plurality of processing requests.

At step 606, process 600 may determine if a selected processing load can be credited safely. For example, the system may determine a selected processing load for the processing request. The system may determine a current available processing load at the first supplemental address for the second blockchain network. The system may compare the current available processing load to a threshold processing load for the first supplemental address.

At step 608, process 600 may credit the user. For example, the system may determine the current available processing load is below the threshold processing load. The system may generate a blockchain operation from the first supplemental address to the second blockchain address, wherein the second blockchain operation has the selected processing load for the processing request. The system may repeat until no incoming processing requests remain.

At step 610, process 600 may return the receive back on the queue and wait for state change. For example, the system may in response to determining the current available processing load equals the threshold processing load, select an additional processing request. The system may repeat until no incoming processing requests remain.

Figure 7:
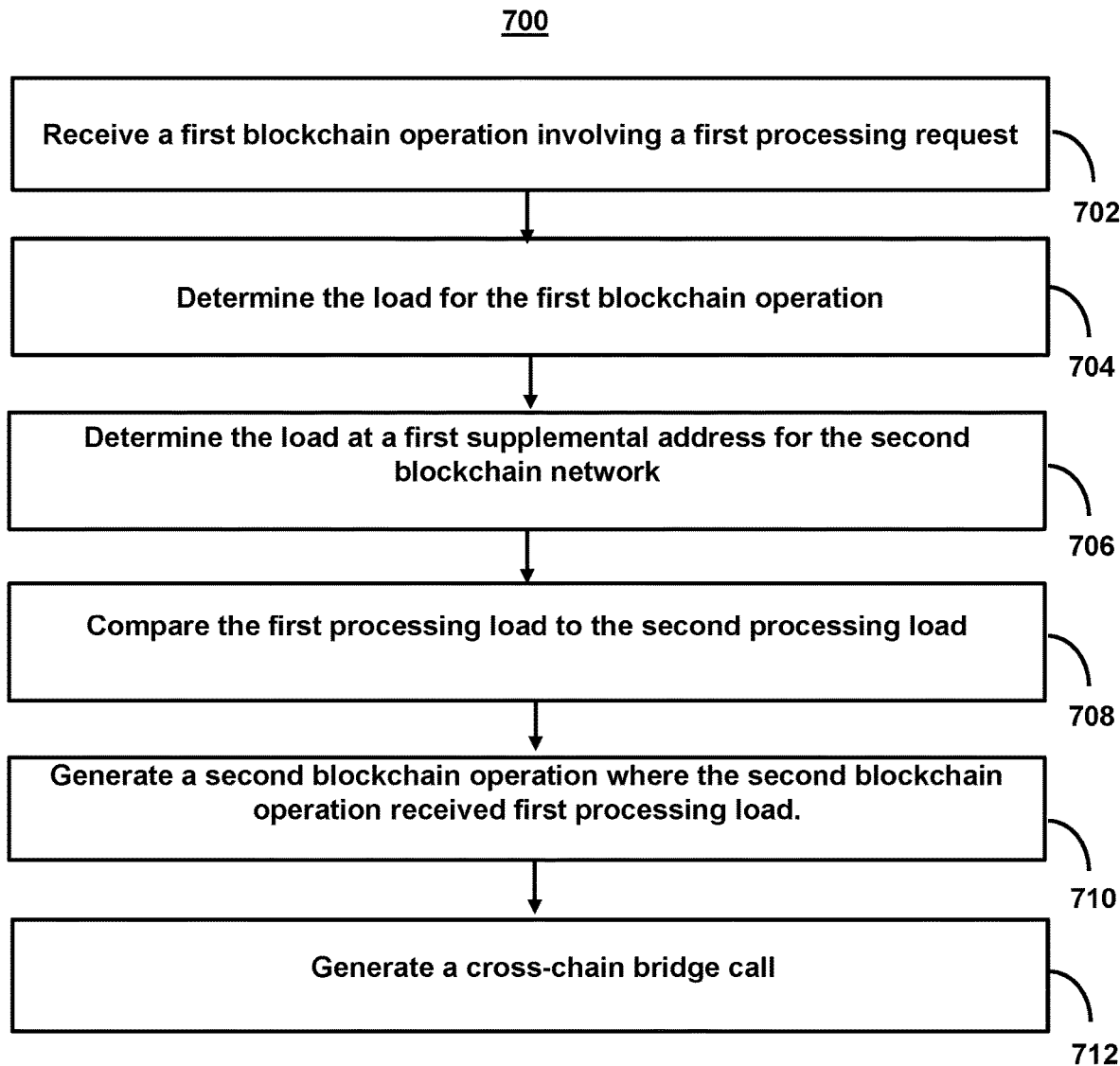
FIG. 7 shows a flowchart of the steps involved in receiving a first blockchain operation involving a first processing request, in accordance with one or more embodiments.

FIG. 7 shows a flowchart of the steps involved in managing blockchain processing loads of blockchain operations conducted across multiple blockchain networks with a platform load balancer, in accordance with one or more embodiments. For example, the system may use process 700 (e.g., as implemented on one or more system components described above) in order to allow the user to easily access a multi-network asset (layer one and layer two of blockchain technology).

At step 702, process 700 (e.g., using one or more components described above) receives a first blockchain operation involving a first processing request. For example, the system may receive, at a platform load balancer, a first blockchain operation involving a first processing request from a first blockchain address on a first blockchain network to a second blockchain address on a second blockchain network. For example, the system may receive a request from the user to exchange two different cryptocurrencies. By doing so, the system may significantly reduce latency and reduce the reliance on application-based server-side hardware and software dependencies.

At step 704, process 700 determines the load for the first blockchain operation. For example, the system may determine, at the platform load balancer, a processing load for the first blockchain operation. For example, the system may start processing the amount of the first blockchain operation. By doing so, the system may eliminate gas fees.

At step 706, process 700 determines the load at a first supplemental address for the second blockchain network. For example, the system may determine, at the platform load balancer, an available processing load at a first supplemental address for the second blockchain network. For example, the system may process the amount of the second blockchain operation. By doing so, the system may eliminate long waiting times.

At step 708, process 700 compares the first processing load to the second processing load. For example, the system may compare the processing load to the available processing load. For example, the system may compare the values of the different cryptocurrencies to make sure they are equal in value. By doing so, the system may eliminate waiting time for users, and also may give the user an option to know whether the exchange can be done right away.

At step 710, process 700 generates a second blockchain operation where the second blockchain operation received the first processing load. For example, the system may, in response to determining that the processing load is within the available processing load, generate a second blockchain operation from the first supplemental address to the second blockchain address, wherein the second blockchain operation has the processing load. For example, the system may exchange the two cryptocurrencies after making sure the liquidity pool has the necessary funds. By doing so, the system may have one single seamless interface for the whole transaction.

At step 712, process 700 the platform load balancer generates a cross-chain bridge call. For example, the system may, in response to determining that the processing load is not within the available processing load, generate a cross-chain bridge call. For example, the system may exchange the two cryptocurrencies through a cross-chain bridge if the liquidity pool does not have the necessary funds. By doing so, the system has an alternative method to exchange cryptocurrencies.

In some embodiments, the platform load balancer generates a cross-chain bridge call using a wrapped token. For example, the system may request a wrapped token, issued by a cross-chain bridge provider platform, corresponding to the processing load and the system may then receive the wrapped token. For example, the system may use several approaches to enable blockchain operations with a cross-chain bridge. In one approach, the system may use a wrapped token issued by the cross-chain bridge provider platform. For example, with a wrapped token, the value of one token from a specific blockchain network can be encapsulated inside another token. By doing so, the system may easily transfer tokens between different layers.

In some embodiments, the platform load balancer generates the cross-chain bridge call using an additional liquidity pool. For example, the system may request a third blockchain operation issued from a second supplemental address to the second blockchain address, and the system may then receive a confirmation of the third blockchain operation from the second supplemental address. For example, the system may also enable cross-chain bridge blockchain operation using an additional liquidity pool provided by a third party (e.g., a cross-chain bridge provider platform). For example, the cross-chain bridge provider platform may use a liquidity pool that holds inventory, or pools, of various coins where one can be exchanged for another. By doing so, the system may easily transfer cryptocurrencies between different layers of the blockchain.

In some embodiments, the system may receive a notification due to an inoperable bridge. For example, the system may receive a notification that a cross-chain bridge is inoperable in response to the cross-chain bridge call; and in response to receiving the notification, the system may generate a message to a user account corresponding to the first blockchain address indicating that the first blockchain operation cannot be performed. For example, the system may provide warnings to users who wish to deposit funds from or to a network where assets might be (temporarily) stranded due to an inoperable bridge.

In some embodiments, the system may compare the available processing load to a threshold processing load. For example, the system may, in response to determining that the processing load is within the available processing load, compare the available processing load to a threshold processing load, and the system may determine to generate the second blockchain operation based on the available processing load being below the threshold processing load. For example, the system may monitor available liquidity on either side, and initiate bridging transactions in the event that there is insufficient liquidity on one side to satisfy potential user withdrawals. Additionally, or alternatively, the system may initiate bridging transactions in the event that there is too much liquidity on the non-native side, e.g., an amount that would not be covered by insurance.

In some embodiments, the system may transmit a confirmation that the processing load is within the available processing load. For example, the system may receive, at the platform load balancer, a first user request, wherein the first user request requests to verify that the processing load is within the available processing load, and the system may then transmit a confirmation that the processing load is within the available processing load. For example, the system may provide endpoints where services (such as digital applications) may query whether a specific blockchain operation would be able to be supported "instantly" (e.g., without generating a cross-chain bridge call).

In some embodiments, the system may determine an amount of net processing loads available to the first blockchain address. For example, the system may receive, at the platform load balancer, a second user request, wherein the second user request requests to determine an amount of net processing loads available to the first blockchain address for a plurality of blockchain operations, and the system may then transmit the amount of net processing loads to a user account corresponding to the first blockchain address. For example, the system may provide data on a user's total balance of the asset across all networks (e.g., how much Ethereum is available to the user for withdrawal in total, not how much of the amount they have deposited happens to reside on the Ethereum native side and how much is on the Polygon side).

In some embodiments, the system may store in a digital storage repository. For example, the system may determine an available processing load at a first supplemental address, wherein the first supplemental address corresponds to a digital storage repository for the platform load balancer. For example, the system may use a separate hot pool for its allocation of liquidity that was created specifically for the service in order to ensure isolation. By doing so, the system may ensure isolation between the liquidity pool and the user's funds.

In some embodiments, the system may generate a second blockchain operation from the first supplemental address to the second blockchain address in a manner that further comprises generating a fourth blockchain operation from a third supplemental address, wherein both the third supplemental address and the fourth supplemental address correspond to the platform load balancer, and wherein the third supplemental address corresponds to a digital storage repository for the platform load balancer, and wherein the fourth supplemental address corresponds to a physical storage repository. For example, the system may generate the second blockchain operation from the first supplemental address to the second blockchain address, wherein generating the second blockchain operation from the first supplemental address to the second blockchain address further comprises generating a fourth blockchain operation from a third supplemental address to a fourth supplemental address, wherein both the third supplemental address and the fourth supplemental address correspond to the platform load balancer, wherein the third supplemental address corresponds to a digital storage repository for the platform load balancer, and wherein the fourth supplemental address corresponds to a physical storage repository. For example, the primary network will support cold storage, while the supplemental address will not. The system may need to manage hot and/or cold storage for the same asset on each additional network, where the system may add pools on each alternate network for a given asset, e.g., Polygon+WETH. By doing so, the system may securely store the user's data.

In some embodiments, the system may return the aggregate processing load to the first blockchain network. For example, the system may receive, at the platform load balancer, a plurality of processing requests from the first blockchain address on the first blockchain network to the second blockchain address on the second blockchain network. The system may determine, at the platform load balancer, an aggregate processing load of the plurality of processing requests. The system may determine, at the platform load balancer, a current available processing load at the first supplemental address for the second blockchain network. The system may compare the current available processing load to a threshold processing load for the first supplemental address. The system may, in response to determining that the current available processing load equals the threshold processing load, return the aggregate processing load to the first blockchain network. For example, the system may pause crediting a user with transferred funds until sufficient funds can be bridged to the cryptocurrency should the pool become too deep. By doing so, the system may prevent users from losing funds in an unstable cryptocurrency.

In some embodiments, the system may generate a priority queue of processing requests. For example, the system may receive, at the platform load balancer, a plurality of processing requests from the first blockchain address on the first blockchain network to the second blockchain address on the second blockchain network. The system may generate a priority queue of processing requests by selecting a processing request. The system may determine, at the platform load balancer, a selected processing load for the processing request. The system may determine, at the platform load balancer, a current available processing load at the first supplemental address for the second blockchain network. The system may compare the current available processing load to a threshold processing load for the first supplemental address. The system may determine that the current available processing load is below the threshold processing load. The system may generate a blockchain operation from the first supplemental address to the second blockchain address, wherein the second blockchain operation has the selected processing load for the processing request. The system may repeat until no processing requests remain. For example, the system may prioritize smaller requests to be fulfilled first. By doing so, users do not need to wait for long periods of time for requests to be fulfilled.

In some embodiments, the system may select an additional processing request. For example, the system may, in response to determining that the current available processing load equals the threshold processing load, select an additional processing request. For example, if the system determines that a request is too large and will drain the liquidity pool, then the system may select another processing request that is smaller to fulfill first. By doing so, the system is optimized so that users with smaller requests do not need to wait for long periods of time for requests to be fulfilled.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising receiving, at a platform load balancer, a first blockchain operation involving a first processing request from a first blockchain address on a first blockchain network to a second blockchain address on a second blockchain network; determining, at the platform load balancer, a processing load for the first blockchain operation; determining, at the platform load balancer, an available processing load at a first supplemental address for the second blockchain network; comparing the processing load to the available processing load; in response to determining that the processing load is within the available processing load, generating a second blockchain operation from the first supplemental address to the second blockchain address, wherein the second blockchain operation has the processing load; and in response to determining that the processing load is not within the available processing load, generating a cross-chain bridge call.

2. The method of the preceding embodiment, wherein generating the cross-chain bridge call comprises: requesting a wrapped token, issued by a cross-chain bridge provider platform, corresponding to the processing load; and receiving the wrapped token.

3. The method of any one of the preceding embodiments, wherein generating the cross-chain bridge call comprises: requesting a third blockchain operation issued from a second supplemental address to the second blockchain address; and receiving a confirmation of the third blockchain operation being performed by the second supplemental address.

4. The method of any one of the preceding embodiments, comprising receiving a notification that a cross-chain bridge is inoperable in response to the cross-chain bridge call; and in response to receiving the notification, generating a message to a user account corresponding to the first blockchain address indicating that the first blockchain operation cannot be performed.

5. The method of any one of the preceding embodiments, comprising, in response to determining that the processing load is within the available processing load, comparing the available processing load to a threshold processing load; and determining to generate the second blockchain operation based on the available processing load being below the threshold processing load.

6. The method of any one of the preceding embodiments, comprising receiving, at the platform load balancer, a first user request, wherein the first user request requests to verify that the processing load is within the available processing load; and transmitting a confirmation that the processing load is within the available processing load.

7. The method of any one of the preceding embodiments, comprising receiving, at the platform load balancer, a second user request, wherein the second user request requests to determine an amount of net processing loads available to the first blockchain address for a plurality of blockchain operations; and transmitting the amount of net processing loads to a user account corresponding to the first blockchain address.

8. The method of any one of the preceding embodiments, wherein the first supplemental address corresponds to a digital storage repository for the platform load balancer.

9. The method of any one of the preceding embodiments, further comprising: receiving, at the platform load balancer, a plurality of processing requests from the first blockchain address on the first blockchain network to the second blockchain address on the second blockchain network; determining, at the platform load balancer, an aggregate processing load of the plurality of processing requests; determining, at the platform load balancer, a current available processing load at the first supplemental address for the second blockchain network; comparing the current available processing load to a threshold processing load for the first supplemental address; and in response to determining that the current available processing load equals the threshold processing load, returning the aggregate processing load to the first blockchain network.

10. The method of any one of the preceding embodiments, further comprising: receiving, at the platform load balancer, a plurality of processing requests from the first blockchain address on the first blockchain network to the second blockchain address on the second blockchain network; and generating a priority queue of processing requests by: selecting a processing request; determining, at the platform load balancer, a selected processing load for the processing request; determining, at the platform load balancer, a current available processing load at the first supplemental address for the second blockchain network; comparing the current available processing load to a threshold processing load for the first supplemental address; determining the current available processing load is below the threshold processing load; generating a blockchain operation from the first supplemental address to the second blockchain address, wherein the second blockchain operation has the selected processing load for the processing request; and repeating until no incoming processing requests remain.

11. A tangible, non-transitory, machine-readable medium storing instructions that, when executed by a data processing apparatus, cause the data processing apparatus to perform operations comprising those of any of embodiments 1-10.

12. A system comprising one or more processors; and memory storing instructions that, when executed by the processors, cause the processors to effectuate operations comprising those of any of embodiments 1-10.

13. A system comprising means for performing any of embodiments 1-10.

What is claimed is:

1. A system for managing blockchain processing loads of blockchain operations conducted across multiple blockchain networks, the system comprising:
   one or more processors; and
   a non-transitory computer-readable medium having instructions recorded thereon that when executed by the one or more processors cause operations comprising:
      receiving, at a platform load balancer, a first blockchain operation involving a first processing request from a first blockchain address on a first blockchain network to a second blockchain address on a second blockchain network, wherein the first blockchain operation is received from a first user interface on a first user device, and wherein the first blockchain address corresponds to a first cryptography-based storage application, wherein the first cryptography-based storage application corresponds to a first private key;
      determining, at the platform load balancer, a processing load for the first blockchain operation;
      determining, at the platform load balancer, an available processing load at a first supplemental address for the second blockchain network;
      comparing the processing load to the available processing load; and
      in response to determining that the processing load is within the available processing load, generating a second blockchain operation from the first supplemental address to the second blockchain address, wherein the second blockchain operation has the processing load, wherein the second blockchain address corresponds to a second cryptography-based storage application, wherein the second cryptography-based storage application corresponds to a second private key.

2. The system of claim 1, wherein generating the second blockchain operation from the first supplemental address to the second blockchain address further comprises generating a fourth blockchain operation from a third supplemental address to a fourth supplemental address, wherein both the third supplemental address and the fourth supplemental address correspond to the platform load balancer, wherein the third supplemental address corresponds to a digital storage repository for the platform load balancer, and wherein the fourth supplemental address corresponds to a physical storage repository.

3. A method for managing blockchain processing loads of blockchain operations conducted across multiple blockchain networks, the method comprising:
 receiving, at a platform load balancer, a first blockchain operation involving a first processing request from a first blockchain address on a first blockchain network to a second blockchain address on a second blockchain network;
 determining, at the platform load balancer, a processing load for the first blockchain operation;
 determining, at the platform load balancer, an available processing load at a first supplemental address for the second blockchain network;
 comparing the processing load to the available processing load;
 in response to determining, at the platform load balancer, that the processing load is within the available processing load, generating a second blockchain operation from the first supplemental address to the second blockchain address, wherein the second blockchain operation has the processing load; and
 in response to determining that the processing load is not within the available processing load, generating a cross-chain bridge call.

4. The method of claim 3, wherein generating the cross-chain bridge call comprises:
 requesting a wrapped token, issued by a cross-chain bridge provider platform, corresponding to the processing load; and
 receiving the wrapped token.

5. The method of claim 3, wherein generating the cross-chain bridge call comprises:
 requesting a third blockchain operation issued from a second supplemental address to the second blockchain address; and
 receiving a confirmation of the third blockchain operation being performed by the second supplemental address.

6. The method of claim 3, further comprising:
 receiving a notification that a cross-chain bridge is inoperable in response to the cross-chain bridge call; and
 in response to receiving the notification, generating a message to a user account corresponding to the first blockchain address indicating that the first blockchain operation cannot be performed.

7. The method of claim 3, further comprising:
 in response to determining that the processing load is within the available processing load, comparing the available processing load to a threshold processing load; and
 determining to generate the second blockchain operation based on the available processing load being below the threshold processing load.

8. The method of claim 3, further comprising:
 receiving, at the platform load balancer, a first user request, wherein the first user request requests to verify that the processing load is within the available processing load; and
 transmitting a confirmation that the processing load is within the available processing load.

9. The method of claim 3, further comprising:
 receiving, at the platform load balancer, a second user request, wherein the second user request requests to determine an amount of net processing loads available to the first blockchain address for a plurality of blockchain operations; and
 transmitting the amount of net processing loads to a user account corresponding to the first blockchain address.

10. The method of claim 3, wherein the first supplemental address corresponds to a digital storage repository for the platform load balancer.

11. The method of claim 3, further comprising:
 receiving, at the platform load balancer, a plurality of processing requests from the first blockchain address on the first blockchain network to the second blockchain address on the second blockchain network;
 determining, at the platform load balancer, an aggregate processing load of the plurality of processing requests;
 determining, at the platform load balancer, a current available processing load at the first supplemental address for the second blockchain network;
 comparing the current available processing load to a threshold processing load for the first supplemental address; and
 in response to determining that the current available processing load equals the threshold processing load, returning the aggregate processing load to the first blockchain network.

12. The method of claim 3, further comprising:
 receiving, at the platform load balancer, a plurality of processing requests from the first blockchain address on the first blockchain network to the second blockchain address on the second blockchain network; and
 generating a priority queue of processing requests by:
  selecting a processing request;
  determining, at the platform load balancer, a selected processing load for the processing request;
  determining, at the platform load balancer, a current available processing load at the first supplemental address for the second blockchain network;
  comparing the current available processing load to a threshold processing load for the first supplemental address;
  determining the current available processing load is below the threshold processing load;
  generating a blockchain operation from the first supplemental address to the second blockchain address, wherein the second blockchain operation has the selected processing load for the processing request; and
  repeating until no incoming processing requests remain.

13. The method of claim 12, wherein comparing the current available processing load to the threshold processing load for the first supplemental address further comprises:
 in response to determining the current available processing load equals the threshold processing load, selecting an additional processing request.

14. A non-transitory computer-readable medium having instructions recorded thereon that when executed by one or more processors cause operations comprising:
 receiving, at a platform load balancer, a first blockchain operation involving a first processing request from a first blockchain address on a first blockchain network to a second blockchain address on a second blockchain network;
 determining, at the platform load balancer, a processing load for the first blockchain operation;
 determining, at the platform load balancer, an available processing load at a first supplemental address for the second blockchain network;
 comparing the processing load to the available processing load;
 in response to determining, at the platform load balancer, that the processing load is within the available processing load, generating a second blockchain operation from the first supplemental address to the second blockchain address, wherein the second blockchain operation has the processing load; and in response to determining that the processing load is not within the available processing load, generating a cross-chain bridge call.

15. The non-transitory computer-readable medium of claim 14, wherein generating the cross-chain bridge call comprises:

requesting a third blockchain operation issued from a second supplemental address to the second blockchain address; and receiving a confirmation of the third blockchain operation being performed by the second supplemental address.

16. The non-transitory computer-readable medium of claim 14, wherein the instructions cause operations further comprising:

receiving a notification that a cross-chain bridge is inoperable in response to the cross-chain bridge call; and in response to receiving the notification, generating a message to a user account corresponding to the first blockchain address indicating that the first blockchain operation cannot be performed.

17. The non-transitory computer-readable medium of claim 14, wherein the instructions cause operations further comprising:

in response to determining that the processing load is within the available processing load, comparing the available processing load to a threshold processing load; and determining to generate the second blockchain operation based on the available processing load being below the threshold processing load.

18. The non-transitory computer-readable medium of claim 14, wherein the instructions cause operations further comprising:

receiving, at the platform load balancer, a first user request, wherein the first user request requests to verify that the processing load is within the available processing load; and transmitting a confirmation that the processing load is within the available processing load.

19. The non-transitory computer-readable medium of claim 14, wherein the instructions cause operations further comprising:

receiving, at the platform load balancer, a second user request, wherein the second user request requests to determine an amount of net processing loads available to the first blockchain address for a plurality of blockchain operations; and transmitting the amount of net processing loads to a user account corresponding to the first blockchain address.

20. The non-transitory computer-readable medium of claim 14, wherein generating the second blockchain operation from the first supplemental address to the second blockchain address further comprises generating a fourth blockchain operation from a third supplemental address to a fourth supplemental address, wherein both the third supplemental address and the fourth supplemental address correspond to the platform load balancer, wherein the third supplemental address corresponds to a digital storage repository for the platform load balancer, and wherein the fourth supplemental address corresponds to a physical storage repository.

* * * * *